US011455224B2

(12) United States Patent
Vittal et al.

(10) Patent No.: US 11,455,224 B2
(45) Date of Patent: Sep. 27, 2022

(54) DISPLAYING A SERVICE GRAPH IN ASSOCIATION WITH A TIME OF A DETECTED ANOMALY

(71) Applicant: Citrix Systems, Inc., Fort Lauderdale, FL (US)

(72) Inventors: Chiradeep Vittal, Santa Clara, CA (US); Abhishek Chauhan, Santa Clara, CA (US)

(73) Assignee: Citrix Systems, Inc, Fort Lauderdale, FL (US)

( * ) Notice: Subject to any disclaimer, the term of this patent is extended or adjusted under 35 U.S.C. 154(b) by 591 days.

(21) Appl. No.: 16/414,655

(22) Filed: May 16, 2019

(65) Prior Publication Data
US 2020/0364128 A1    Nov. 19, 2020

(51) Int. Cl.
*G06F 11/00*    (2006.01)
*G06F 11/30*    (2006.01)
*G06F 11/07*    (2006.01)
*G06F 9/455*    (2018.01)
*G06F 16/901*    (2019.01)
*G06F 16/11*    (2019.01)

(52) U.S. Cl.
CPC ........ *G06F 11/301* (2013.01); *G06F 9/45558* (2013.01); *G06F 11/0709* (2013.01); *G06F 16/128* (2019.01); *G06F 16/9024* (2019.01); G06F 2009/45591 (2013.01)

(58) Field of Classification Search
CPC .............. G06F 11/3466; G06F 11/079; G06F 11/3409; G06F 11/0751; G06F 11/0754; G06F 11/34; G06F 11/3452; G06F 11/3636
See application file for complete search history.

(56) References Cited

U.S. PATENT DOCUMENTS

| | | | |
|---|---|---|---|
| 2010/0100774 A1* | 4/2010 | Ding ................... | G06F 11/3636 714/45 |
| 2010/0211754 A1* | 8/2010 | Crosby ................. | G06F 11/366 711/170 |
| 2015/0033084 A1* | 1/2015 | Sasturkar .......... | G06F 16/24578 714/46 |
| 2017/0126531 A1* | 5/2017 | Nataraj ............. | H04L 29/08072 |

\* cited by examiner

*Primary Examiner* — Charles Ehne
(74) *Attorney, Agent, or Firm* — Foley & Lardner LLP

(57) ABSTRACT

Described embodiments provide systems and methods for displaying a service graph in association with a time of a detected anomaly. A device may store a plurality of snapshots of a service graph of a plurality of microservices. Each of the snapshots of the service graphs include metrics at a respective time increment from execution of each of the plurality of microservices. The device may detect an anomaly with operation of one or more microservices of the plurality of services. The device may identify a set of snapshots of the service graph within a predetermined time period of a time of the anomaly. The device may display each of the snapshots in the set of snapshots of in sequence corresponding to time increments within the predetermined time period of the time of the anomaly.

20 Claims, 11 Drawing Sheets

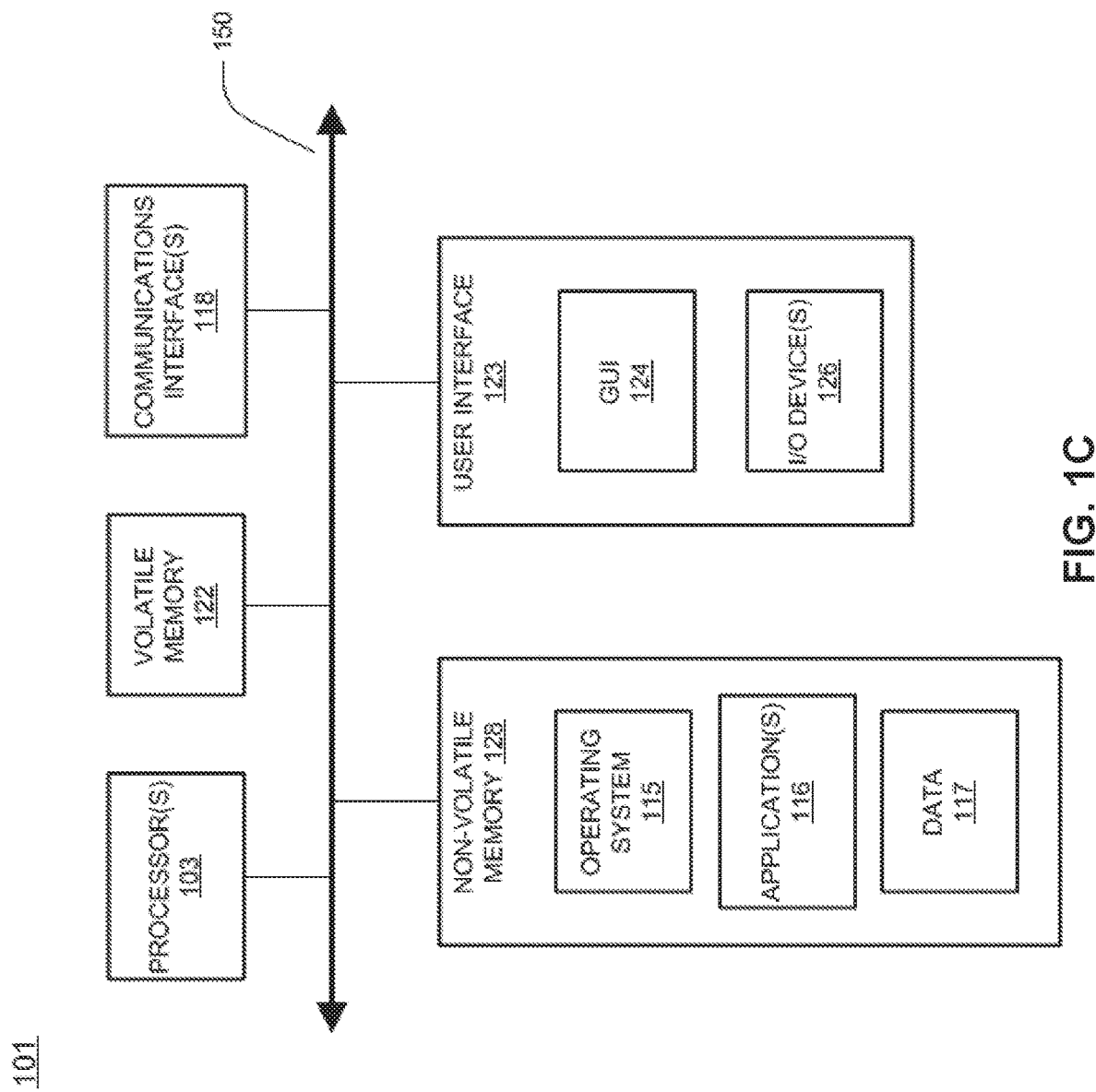

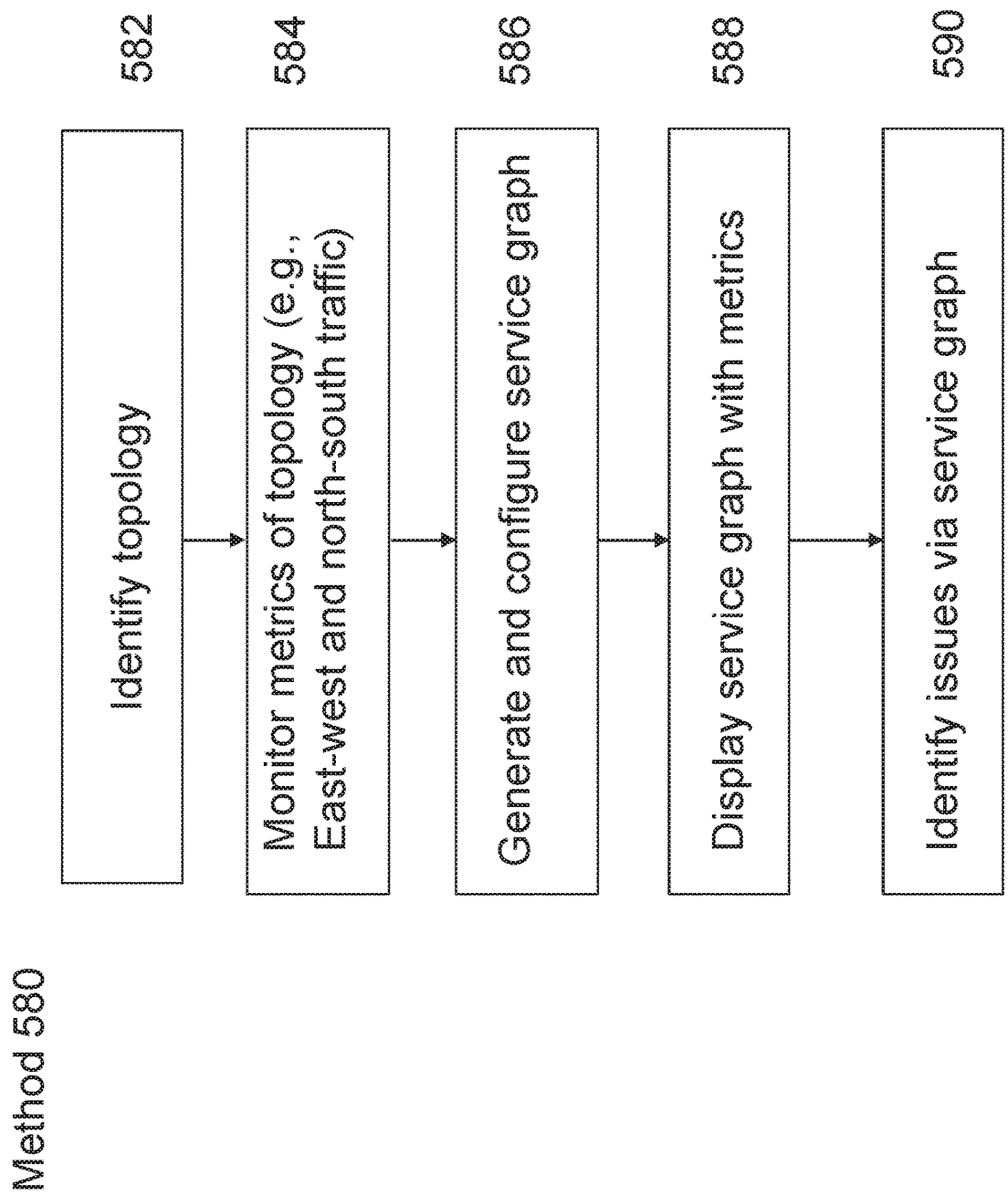

DISPLAYING A SERVICE GRAPH IN ASSOCIATION WITH A TIME OF A DETECTED ANOMALY

FIELD OF THE DISCLOSURE

The present application generally relates to service graphs, including but not limited to systems and methods for displaying a service graph in association with a time of a detected anomaly.

BACKGROUND

Various services may be used, accessed, or otherwise provided to users. Such services may include microservices which perform a subset of tasks or functions which, collectively, provide the service to the user. Some microservice(s) may be updated or replaced with new versions of the microservice(s). In some instances, new versions of the microservice(s) may cause the service to not perform as desired. In some instances, increased network traffic may cause the service to not perform as desired.

SUMMARY

This Summary is provided to introduce a selection of concepts in a simplified form that are further described below in the Detailed Description. This Summary is not intended to identify key features or essential features, nor is it intended to limit the scope of the claims included herewith.

Systems and methods for displaying a service graph in association with a time of a detected anomaly are discussed herein. A service graph may be a tool by which a service including various microservices corresponding thereto may be visualized. Such a tool may be used for network traffic monitoring purposes, diagnostic purposes, troubleshooting purposes, and so forth. The service graph may depict various traffic volume, latency, error rates, and other metrics corresponding to the service. In some implementations, one or more microservices of the service may malfunction, fail, glitch, or otherwise experience a condition which is an anomaly. To correct such conditions, an administrator may identify a cause of the condition. However, identification of the cause of the condition may be difficult without understanding conditions of the microservice(s) leading up to and/or following occurrence of the anomaly.

In some implementations, a device (such as an intermediary device) may store a plurality of snapshots of a service graph of a plurality of microservices generated for each of a plurality of time increments over a time period. The snapshots may include metrics at a respective time increment from execution of each of the microservices. The device may detect an anomaly with operation of one or more of the microservices. The device may identify a set of snapshots of the service graph within a predetermined time period of a time of the anomaly. The device may display each of a sequence of the snapshots in the set corresponding to time increments within the predetermined time period of the time of the anomaly.

Rather than a user (such as an administrator) manually evaluating the microservice(s) which contributed to or caused the anomaly, the implementations described herein may automatically detect the anomaly and provide snapshots of the service graph including metrics corresponding to the service graph. The administrator can thus quickly and efficiently determine the cause of the anomaly based on the data from or represented in the service graph. The implementations described herein may increase the efficiency of diagnostics of anomalies for microservices corresponding to a service by providing a visual aid by which an administrator can observe metrics corresponding to the microservice(s) prior to, during, and/or after the anomaly. The implementations described herein may decrease downtime as a result of such anomalies by providing a faster mechanism by which an administrator can remediate the cause of the anomaly.

An aspect provides a method for displaying a service graph in association with a time of a detected anomaly. The method includes storing, by a device, a plurality of snapshots of a service graph of a plurality of microservices generated for each of a plurality time increments over a time period. Each of the plurality of snapshots of the service graphs may include metrics at a respective time increment from execution of each of the plurality of microservices. The method includes detecting, by the device, an anomaly with operation of one or more microservices of the plurality of services. The method includes identifying, by the device, a set of snapshots from the plurality of snapshots of the service graph within a predetermined time period of a time of the anomaly. The method includes displaying, by the device, each of the snapshots in the set of snapshots of in sequence corresponding to time increments within the predetermined time period of the time of the anomaly.

In some implementations, the predetermined time period includes at least one of an amount of time before the time of the anomaly or an amount of time after the time of the anomaly. In some embodiments, the method further includes determining, by the device, one or more highlights of the service associated with the detected anomaly. In some embodiments, displaying each of the snapshots includes displaying, by the device, the one or more highlights in the service graph displayed via the set of snapshots. In some embodiments, the method further includes identifying, by the device, one or more changes to one of a status or metric of the one or more microservices within the predetermined time period of the time of the anomaly. In some implementations, displaying each of the snapshots further includes displaying, by the device, the one or more changes in the service graph displayed via the set of snapshots.

In some implementations, storing the snapshots further includes establishing, by the device at each of the time increments, metrics for the plurality of microservices. In some embodiments, the method further includes storing, by the device, metrics at each of the time increments with each snapshot of the plurality of snapshots. In some implementations, detecting the anomaly further includes providing, by the device responsive to the detection, a notification of the anomaly. In some implementations, the method further includes receiving, by the device, a request for the service graph at the time of the incident and responsive to the request, displaying one or more of the set of snapshots.

Another aspect provides a system for displaying a service graph in association with a time of a detected anomaly. The system comprises a device including a plurality of processors, coupled to memory and configured to store a plurality of snapshots of a service graph of a plurality of microservices generated for each of a plurality time increments over a time period. Each of the plurality of snapshots of the service graphs include metrics at a respective time increment from execution of each of the plurality of microservices. The processors are further configured to detect an anomaly with operation of one or more microservices of the plurality of services. The processors are further configured to identify a set of snapshots from the plurality of snapshots of the service graph within a predetermined time period of a time of the anomaly. The processors are further configured to display each of the snapshots in the set of snapshots in sequence corresponding to time increments within the predetermined time period of the time of the anomaly.

In some embodiments, the predetermined time period comprises at least one of an amount of time before the time of the anomaly or an amount of time after the time of the anomaly. In some implementations, the processor is further configured to determine, by the device, one or more highlights of the service associated with the detected anomaly. In some embodiments, displaying the set of snapshots includes displaying, by the device, the one or more highlights in the service graph displayed via the set of snapshots. In some implementations, the processor is further configured to identify, by the device, one or more changes to one of a status or metric of the one or more microservices within the predetermined time period of the time of the anomaly. In some embodiments, displaying the set of snapshots includes displaying, by the device, the one or more changes in the service graph displayed via the set of snapshots.

In some implementations, storing the snapshots includes establishing, by the device at each of the time increments, metrics for the plurality of microservices. In some embodiments, the processors are further configured to store, by the device, metrics at each of the time increments with each snapshot of the plurality of snapshots. In some implementations, detecting the anomaly further includes providing, by the device responsive to the detection, a notification of the anomaly. In some embodiments, the processors are further configured to receive, by the device, a request for the service graph at the time of the incident and responsive to the request, displaying one or more of the set of snapshots.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

FIG. 1C is a block diagram of a computing device, in accordance with an illustrative embodiment;

FIG. 5C is a flow diagram of a method of using a service graph, in accordance with an illustrative embodiment;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of a service graph based platform and technology; and Section F describes embodiments of systems and methods for displaying a service graph in association with a time of a detected anomaly.

A. Network and Computing Environment

Figure 1A:
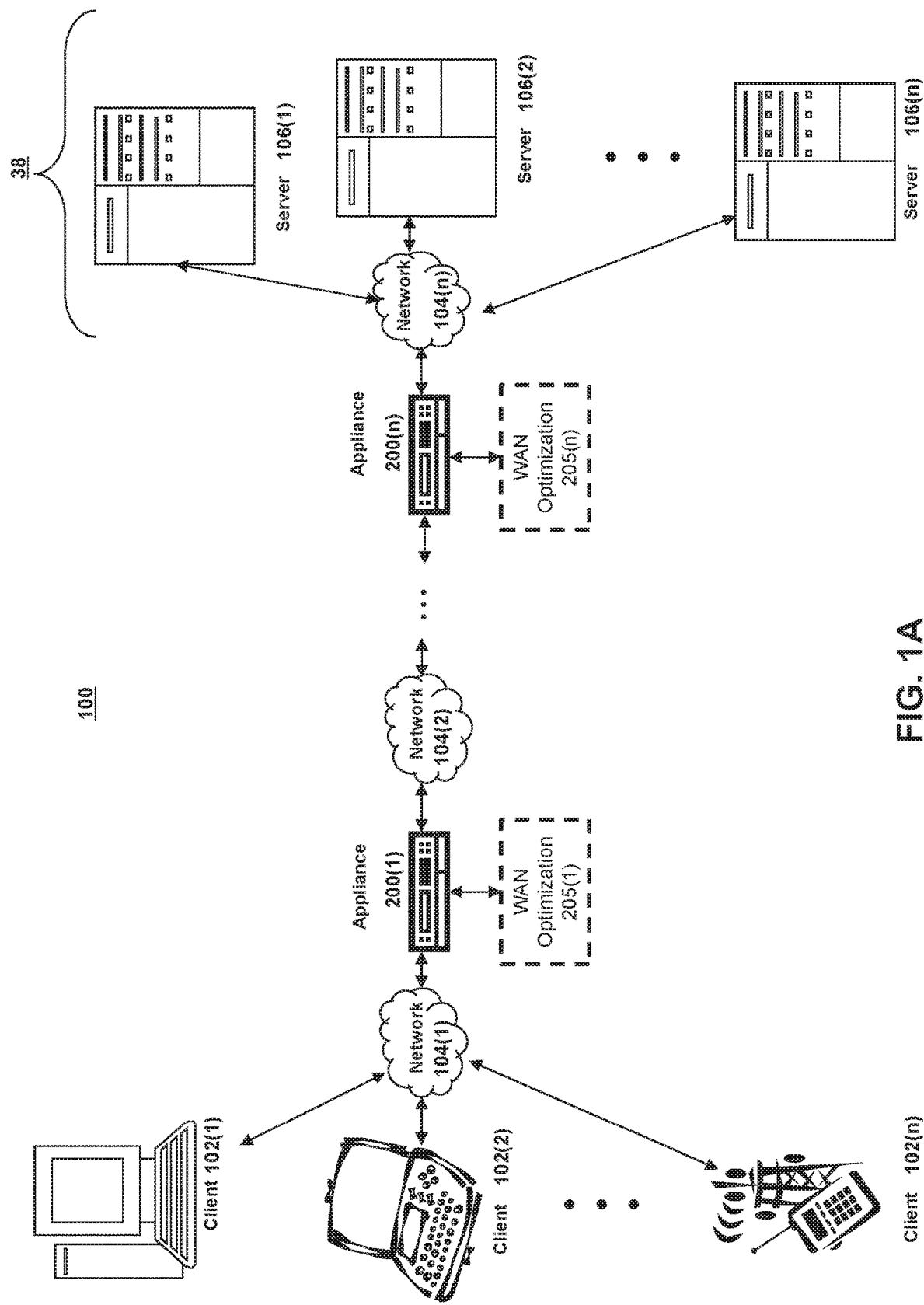
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
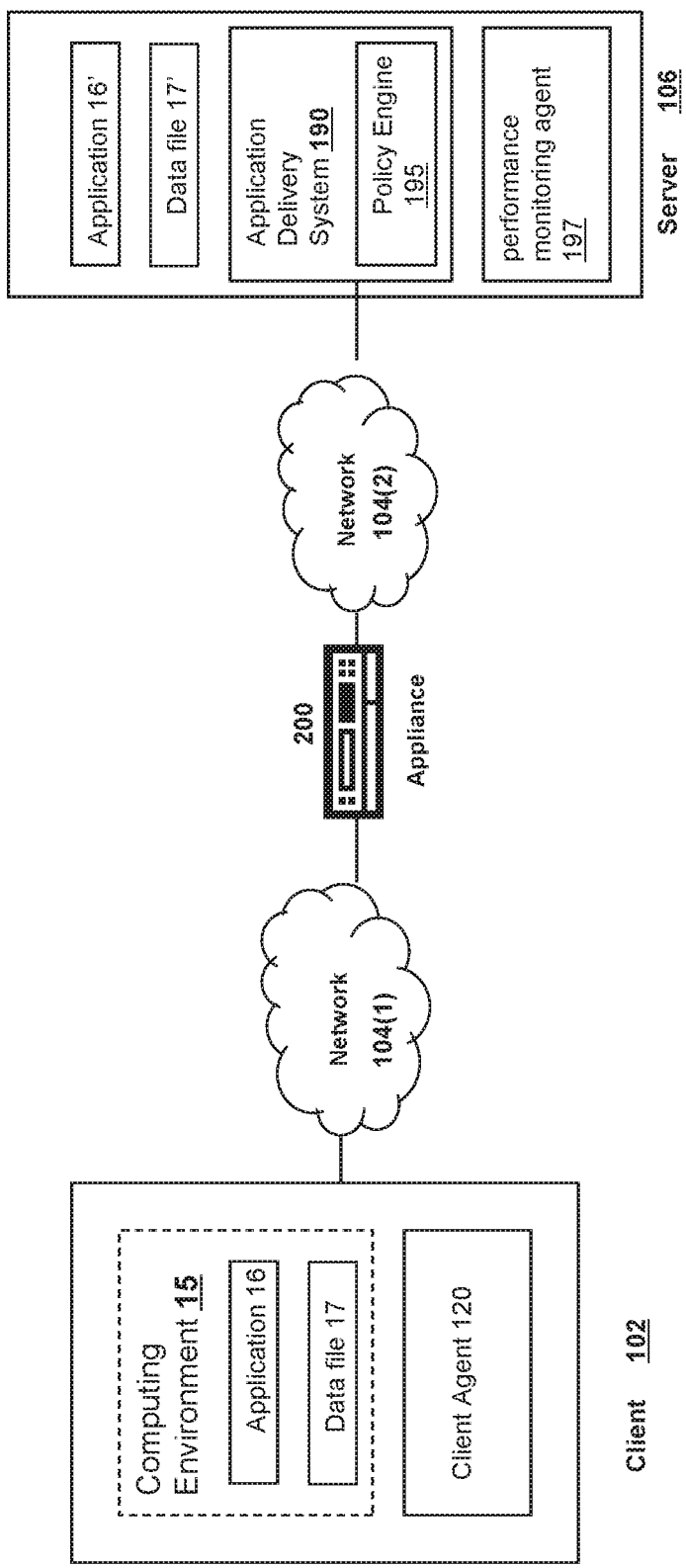
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment 100, clients 102, servers 106, and appliances 200 and 205 may be as described in U.S. Pat. No. 9,538,345, issued Jan. 3, 2017 to Citrix Systems, Inc. of Fort Lauderdale, Fla.

B. Appliance Architecture

Figure 2:
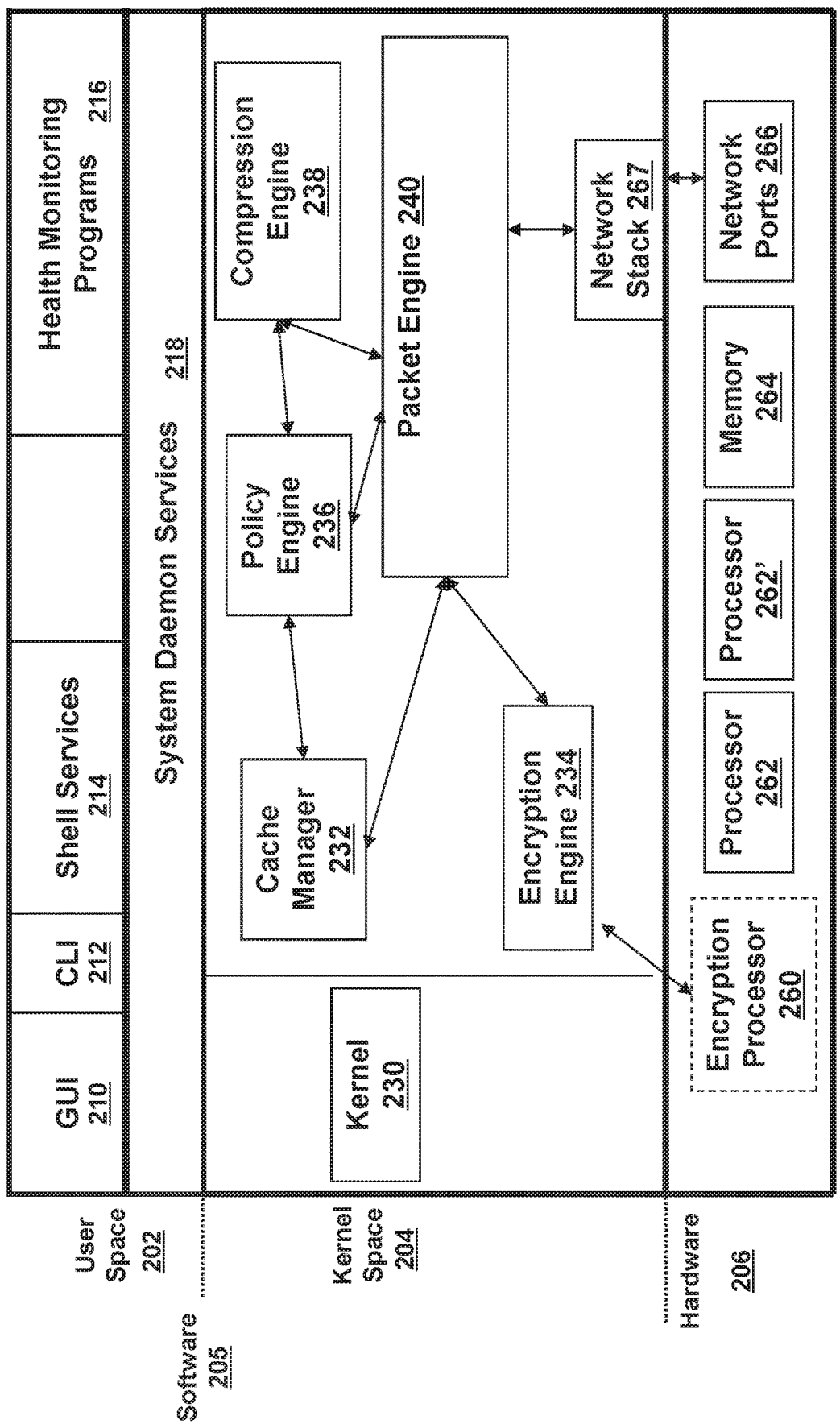
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

Additional details of the implementation and operation of appliance 200 may be as described in U.S. Pat. No. 9,538,345, issued Jan. 3, 2017 to Citrix Systems, Inc. of Fort Lauderdale, Fla.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
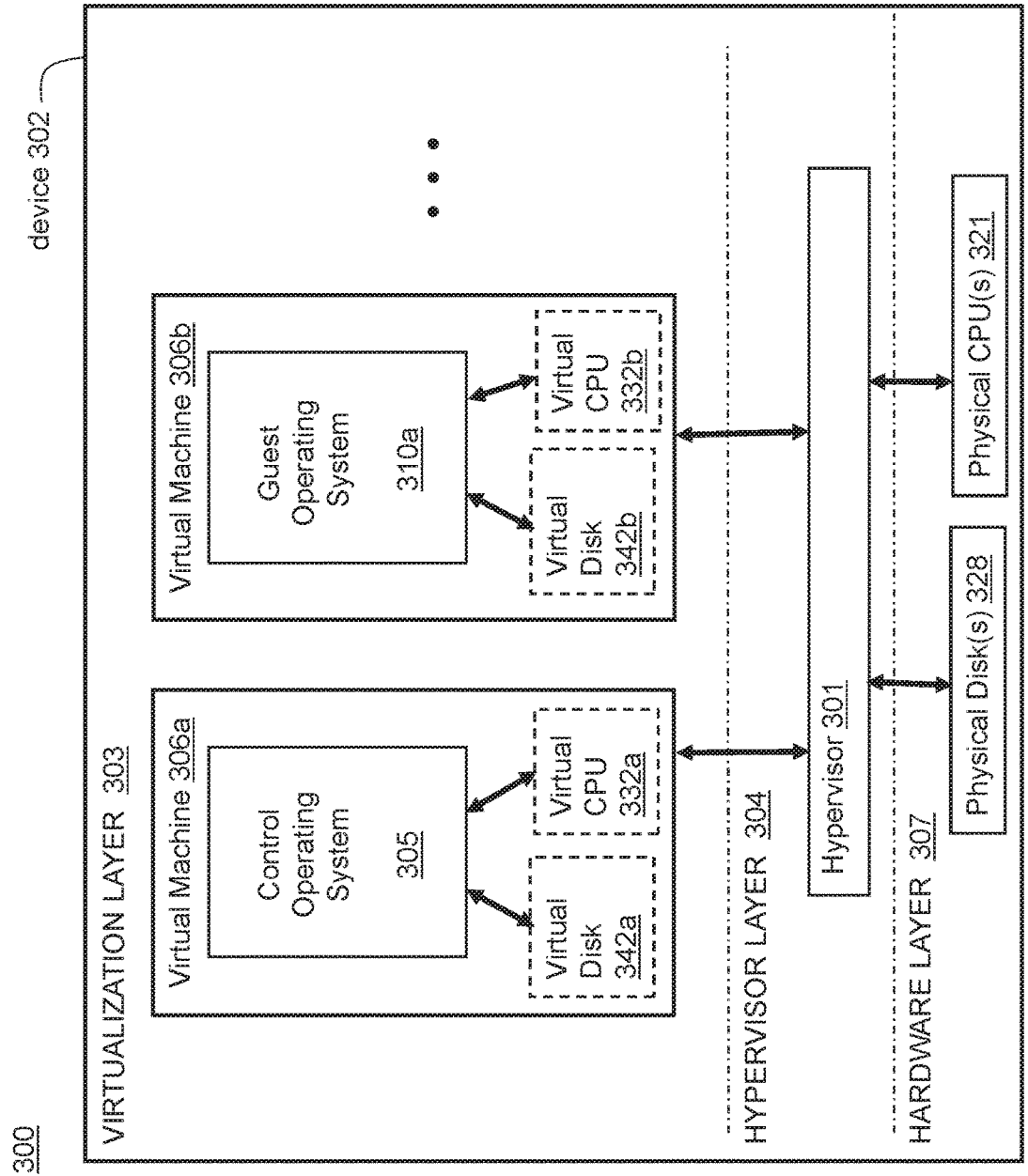
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

Additional details of the implementation and operation of virtualized computing environment 300 may be as described in U.S. Pat. No. 9,538,345, issued Jan. 3, 2017 to Citrix Systems, Inc. of Fort Lauderdale, Fla.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Additional details of the implementation and operation of a multi-processor and/or multi-core system may be as described in U.S. Pat. No. 9,538,345, issued Jan. 3, 2017 to Citrix Systems, Inc. of Fort Lauderdale, Fla.

D. Systems and Methods for Providing a Distributed Cluster Architecture

Figure 4:
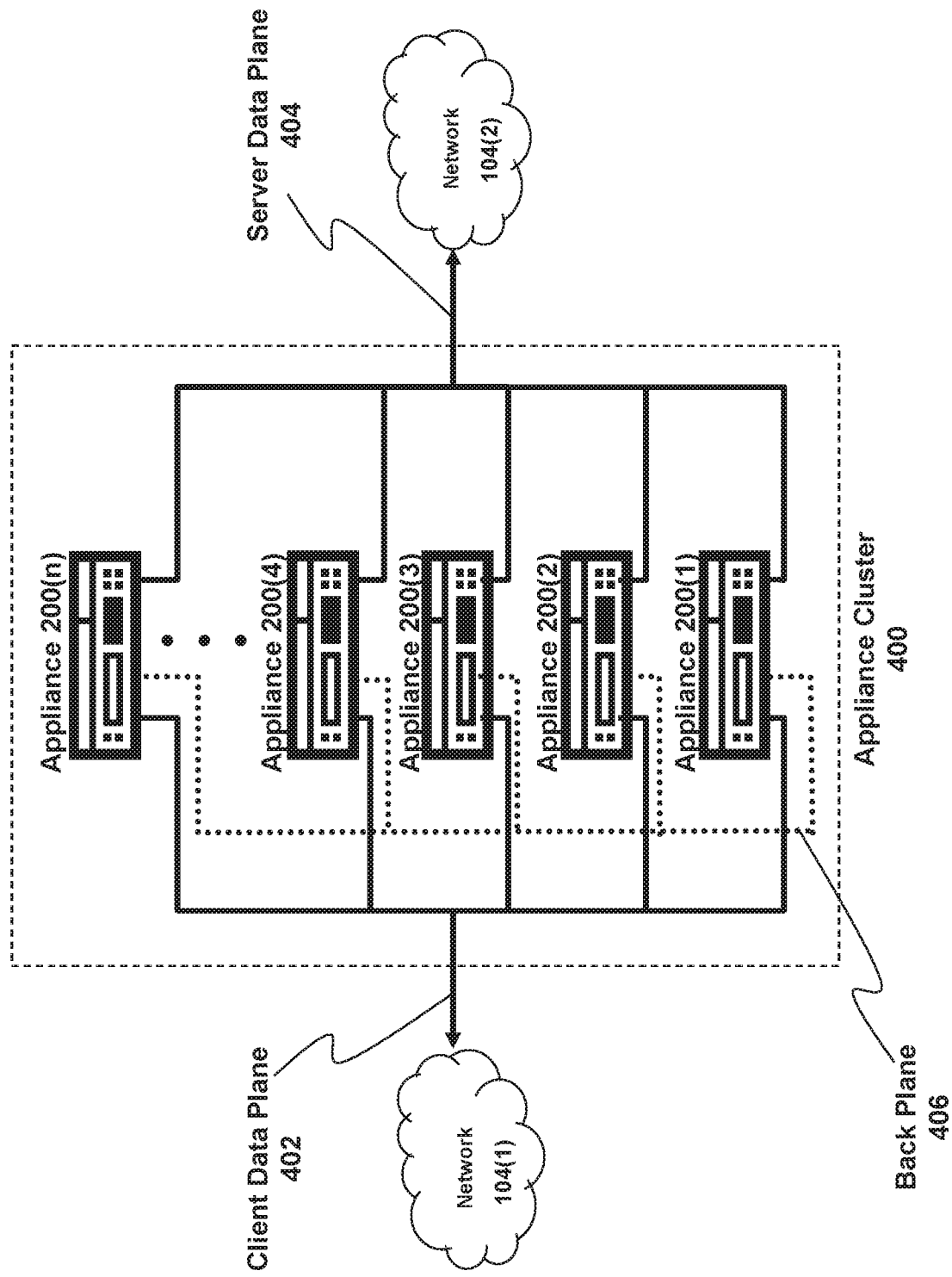
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a first network 104(1) via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104(2) via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Additional details of cluster 400 may be as described in U.S. Pat. No. 9,538,345, issued Jan. 3, 2017 to Citrix Systems, Inc. of Fort Lauderdale, Fla.

E. Service Graph Based Platform and Technology

Figure 5A:
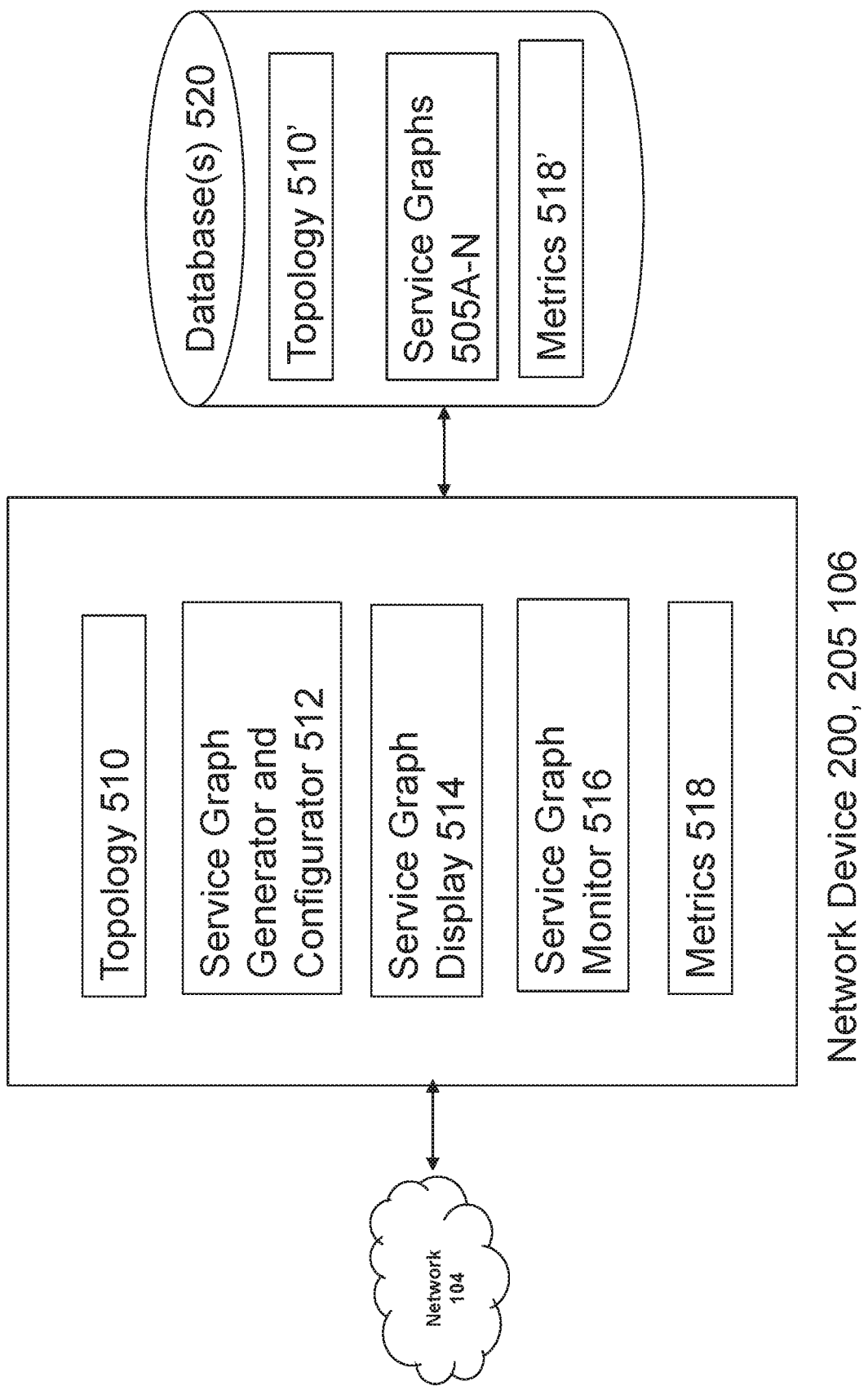
FIG. 5A is a block diagram of a service graph based system, in accordance with an illustrative embodiment.
Figure 5B:
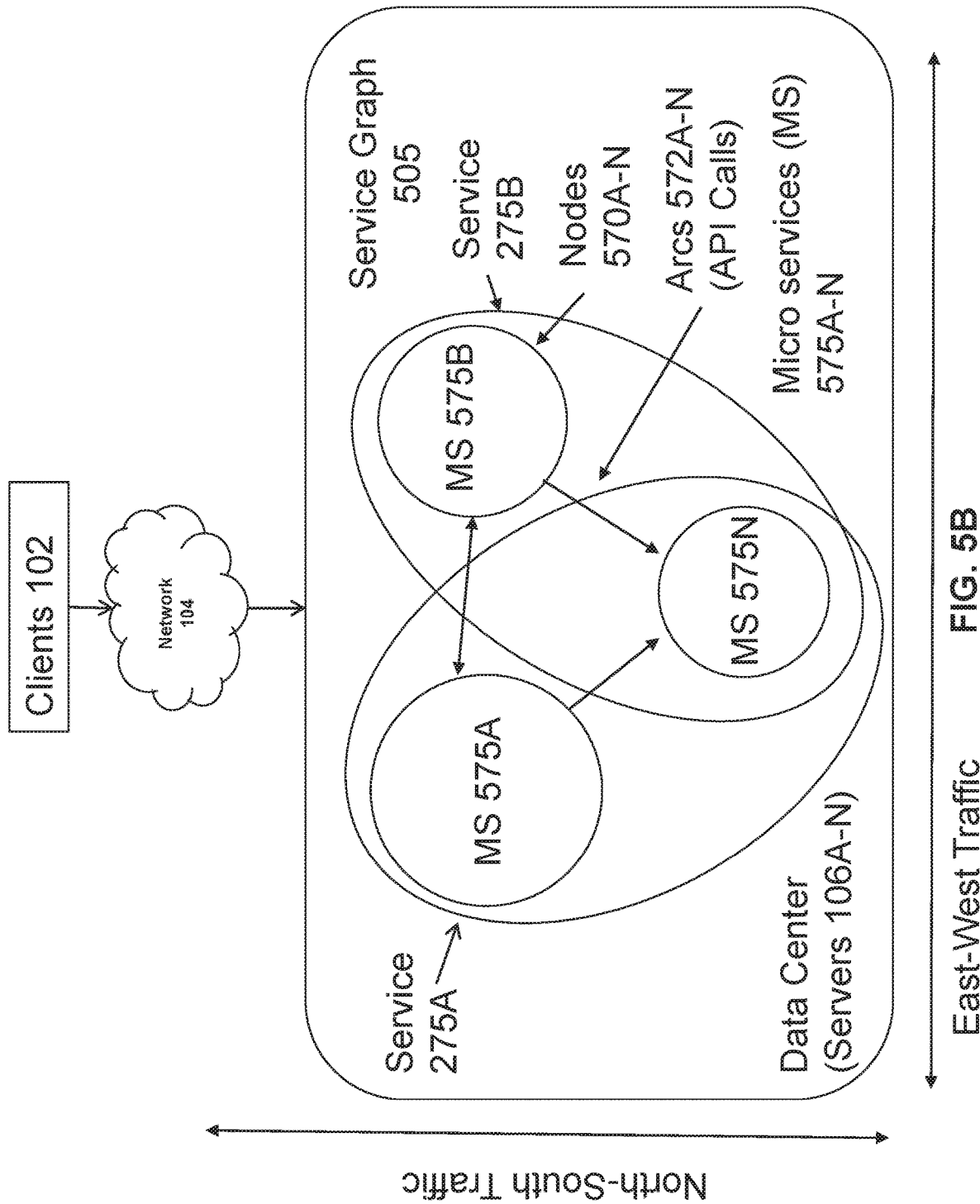
FIG. 5B is a block diagram of a service graph, in accordance with an illustrative embodiment.

Referring now to FIGS. 5A-5C, implementation of systems and methods for a service graph based platform and technology will be discussed. A service graph is a useful technology tool for visualizing a service by its topology of components and network elements. Services may be made up of microservices with each microservice handling a particular set of one or more functions of the service. Network traffic may traverse the service topology such as a client communicating with a server to access service (e.g., north-south traffic). Network traffic of a service may include network traffic communicated between microservices of the services such as within a data center or between data centers (e.g., east-west traffic). The service graph may be used to identify and provide metrics of such network traffic of the service as well as operation and performance of any network elements used to provide the service. Service graphs may be used for identifying and determining issues with the service and which part of the topology causing the issue. Services graphs may be used to provide for administering, managing and configuring of services to improve operational performance of such services.

Referring to FIG. 5A, an implementation of a system for service graphs, such as those illustrated in FIG. 5B, will be described. A device on a network, such as a network device 200, 205 or a server 206, may include a service graph generator and configurator 512, a service graph display 514 and service graph monitor 516. The service graph generator and configurator 512 (generally referred to as service graph generator 512), may identify a topology 510 of elements in the network and metrics 518 related to the network and the elements, to generate and/or configure service graphs 505A-N. The service graphs 505A-N (generally referred to as service graphs 505) may be stored in one or more databases 520, with any of the metric 518' and/or topology 510'. The service graphic generator 512 may generate data of the service graphs 505 to be displayed in a display or rendered form such as via a user interface, generated referred to as service graph display 514. Service graph monitor 516 may monitor the network elements of the topology and service for metrics 518 to configure and generate a service graph 505 and/or to update dynamically or in real-time the elements and metrics 518 of or represented by a service graph display 514.

The topology 510 may include data identifying, describing, specifying or otherwise representing any elements used, traversed in accessing any one or more services or otherwise included with or part of such one or more services, such as any of the services 275 described herein. The topology may include data identifying or describing any one or more networks and network elements traversed to access or use the services, including any network devices, routers, switches, gateways, proxies, appliances, network connections or links, Internet Service Providers (ISPs), etc. The topology may include data identifying or describing any one or more applications, software, programs, services, processes, tasks or functions that are used or traversed in accessing a service. In some implementations, a service may be made up or include multiple microservices, each providing one or more functions, functionality or operations of or for a service. The topology may include data identifying or describing any one or more components of a service, such as programs, functions, applications or microservices used to provide the service. The topology may include parameters, configuration data and/or metadata about any portion of the topology, such as any element of the topology.

A service graph 505 may include data representing the topology of a service 275, such any elements making up such a service or used by the service, for example as illustrated in FIG. 5B. The service graph may be in a node base form, such as graphical form of nodes and each node representing an element or function of the topology of the service. A service graph may represent the topology of a service using nodes connected among each other via various connectors or links, which may be referred to as arcs. The arc may identify a relationship between elements connected by the arc. Nodes and arcs may be arranged in a manner to identify or describe one or more services. Nodes and arcs may be arranged in a manner to identify or describe functions provided by the one or more services. For example, a function node may represent a function that is applied to the traffic, such as a transform (SSL termination, VPN gateway), filter (firewalls), or terminal (intrusion detection systems). A function within the service graph might use one or more parameters and have one or more connectors.

The service graph may include any combination of nodes and arcs to represent a service, topology or portions thereof. Nodes and arcs may be arranged in a manner to identify or describe the physical and/or logical deployment of the service and any elements used to access the service. Nodes and arcs may be arranged in a manner to identify or describe the flow of network traffic in accessing or using a service. Nodes and arcs may be arranged in a manner to identify or describe the components of a service, such as multiple microservices that communicate with each other to provide functionality of the service. The service graph may be stored in storage, such as database 520, in a manner in order for the service graph generator to generate a service graph in memory and/or render the service graph in display form 514.

The service graph generator 512 may include an application, program, library, script, service, process, task or any type and form of executable instructions for establishing, creating, generating, implementing, configuring or updating a service graph 505. The service graph generator may read and/or write data representing the service graph to a database, file or other type of storage. The service graph generator may comprise logic, functions and operations to construct the arrangement of nodes and arcs to have an electronic representation of the service graph in memory. The service graph generator may read or access the data in the database and store data into data structures and memory elements to provide or implement a node based representation of the service graph that can be updated or modified. The service graph generator may use any information from the topology to generate a service graph. The service graph generator may make network calls or use discovery protocols to identify the topology or any portions thereof. The service graph generator may use any metrics, such as in memory or storage or from other devices, to generate a service graph. The service graph generator may comprise logic, functions and operations to construct the arrangement of nodes and arcs to provide a graphical or visual representation of the service graph, such as on a user interface of a display device. The service graph generator may comprise logic, functions and operations to configure any node or arc of the service graph to represent a configuration or parameter of the corresponding or underlying element represented by the node or arc. The service graph generator may comprise logic, functions and operations to include, identify or provide metrics in connection with or as part of the arrangement of nodes and arcs of the service graph display. The service graph generator may comprise an application programming interface (API) for programs, applications, services, tasks, processes or systems to create, modify or interact with a service graph.

The service graph display 514 may include any graphical or electronic representation of a service graph 505 for rendering or display on any type and form of display device. The service graph display may be rendered in visual form to have any type of color, shape, size or other graphical indicators of the nodes and arcs of the service graph to represent a state or status of the respective elements. The service graph display may be rendered in visual form to have any type of color, shape, size or other graphical indicators of the nodes and arcs of the service graph to represent a state or status of one or more metrics. The service graph display may comprise any type of user interface, such as a dashboard, that provides the visual form of the service graph. The service graph display may include any type and form of user interface elements to allow users to interact, interface or manipulate a service graph. Portion of the service graph display may be selectable to identify information, such as metrics or topology information about that portion of the service graph. Portions of the service graph display may provide user interface elements for users to take an action with respect to the service graph or portion thereof, such as to modify a configuration or parameter of the element.

The service graph monitor 518 may include an application, program, library, script, service, process, task or any type and form of executable instructions to receive, identify, process metrics 518 of the topology 510. The service graph monitor 518 monitors via metrics 518 the configuration, performance and operation of elements of a service graph. The service graph monitor may obtain metrics from one or more devices on the network. The service graph monitor may identify or generate metrics from network traffic traversing the device(s) of the service graph monitor. The service graph monitor may receive reports of metrics from any of the elements of the topology, such as any elements represented by a node in the service graph. The service graph monitor may receive reports of metrics from the service. From the metrics, the service graph monitor may determine the state, status or condition of an element represented in or by the service graph, such as by a node of the service graph. From the metrics, the service graph monitor may determine the state, status or condition of network traffic or network connected represented in or by the service graph, such as by an arc of the service graph. The service graph generator and/or service graph monitor may update the service graph display, such as continuously or in predetermined frequencies or event based, with any metrics or any changed in the state, status or condition of a node or arc, element represented by the node or arc, the service, network or network traffic traversing the topology.

The metrics 518, 518' (generally referred to as metrics 518) may be stored on network device in FIG. 5B, such as in memory or storage. The metrics 518, 518' may be stored in a database, such as database 520 in FIG. 5A, on the same device or over a network to another device, such as a server. Metrics may include any type and form of measurement of any element of the topology, service or network. Metrics may include metrics on volume, rate or timing of requests or responses received, transmitted or traversing the network element represented by the node or arc. A Metrics may include metrics on usage of a resource by the element represented by the node or arc, such as memory, bandwidth. Metrics may include metrics on performance and operation of a service, including any components or microservices of the service, such as rate of response, transaction responses and times.

FIG. 5B illustrates an implementation of a service graph in connection with micro-services of a service in view of east-west network traffic and north-south network traffic. In brief overview, clients 102 may access via one or more networks 104 a data center having servers 106A-106N (generally referred to as servers 106) providing one or more services 275A-275N (generally referred to as services 275). The services may be made up multiple microservices 575A-575N (generally referred to as microservice or micro service 575). Service 275A may include microservice 575A and 575N while service 275B may include microservice 575B and 575N. The microservices may communicate among the microservices via application programming interface (APIs). A service graph 505 may represent a topology of the services and metrics on network traffic, such as east-west network traffic and north-south network traffic.

North-south network traffic generally describes and is related to network traffic between clients and servers, such as client via networks 104 to servers of data center and/or servers to clients via network 104 as shown in FIG. 5B. East-west network traffic generally describes and is related to network traffic between elements in the data centers, such as data center to data center, server to server, service to service or microservice to microservice.

A service 275 may comprise microservices 575. In some aspects, microservices is a form of service-oriented architecture style wherein applications are built as a collection of different smaller services rather than one whole or singular application (referred to sometimes as a monolithic application). Instead of a monolithic application, a service has several independent applications or services (e.g., microservices) that can run on their own and may be created using different coding or programming languages. As such, a larger server can be made up of simpler and independent programs or services that are executable by themselves. These smaller programs or services are grouped together to deliver the functionalities of the larger service. In some aspects, a microservices based service structures an application as a collection of services that may be loosely coupled. The benefit of decomposing a service into different smaller services is that it improves modularity. This makes the application or service easier to understand, develop, test, and be resilient to changes in architecture or deployment.

A microservice includes an implementation of one or more functions or functionality. A microservice may be a self-contained piece of business function(s) with clear or established interfaces, such as an application programming interface (API). In some implementations, a microservice may be deployed in a virtual machine or a container. A service may use one or more functions on one microservice and another one or more functions of a different microservice. In operating or executing a service, one microservice may make API calls to another microservice and the microservice may provide a response via an API call, event handler or other interface mechanism. In operating or executing a microservice, the microservice may make an API call to another microservice, which in its operation or execution, makes a call to another microservice, and so on.

The service graph 505 may include multiple nodes 570A-N connected or linked via one or more or arcs 572A-572N. The service graph may have different types of nodes. A node type may be used to represent a physical network element, such as a server, client, appliance or network device. A node type may be used to represent an end point, such as a client or server. A node type may be used to represent an end point group, such as group of clients or servers. A node type may be used to represent a logical network element, such as a type of technology, software or service or a grouping or sub-grouping of elements. A node type may be used to represent a functional element, such as functionality to be provided by an element of the topology or by the service.

The configuration and/or representation of any of the nodes 570 may identify a state, a status and/or metric(s) of the element represented by the node. Graphical features of the node may identify or specify an operational or performance characteristic of the element represented by the node. A size, color or shape of the node may identify an operational state of whether the element is operational or active. A size, color or shape of the node may identify an error condition or issue with an element. A size, color or shape of the node may identify a level of volume of network traffic, a volume of request or responses received, transmitted or traversing the network element represented by the node. A size, color or shape of the node may identify a level of usage of a resource by the element represented by the node, such as memory, bandwidth, CPU or storage. A size, color or shape of the node may identify relativeness with respect to a threshold for any metric associated with the node or the element represented by the node.

The configuration and/or representation of any of the arcs 572 may identify a state, status and/or metric(s) of the element represented by the arc. Graphical features of the arc may identify or specify an operational or performance characteristic of the element represented by the arc. A size, color or shape of the node may identify an operational state of whether the network connection represented by the arc is operational or active. A size, color or shape of the arc may identify an error condition or issue with a connection associated with the arc. A size, color or shape of the arc may identify an error condition or issue with network traffic associated with the arc. A size, color or shape of the arc may identify a level of volume of network traffic, a volume of request or responses received, transmitted or traversing the network connection or link represented by the arc. A size, color or shape of the arc may identify a level of usage of a resource by network connection or traffic represented by the arc, such as bandwidth. A size, color or shape of the node may identify relativeness with respect to a threshold for any metric associated with the arc. In some implementations, a metric for the arc may include any measurement of traffic volume per arc, latency per arc or error rate per arc.

Referring now to FIG. 5C, an implementation of a method for generating and displaying a service graph will be described. In brief overview of method 580, at step 582, a topology is identified, such as for a configuration of one or more services. At step 584, the metrics of elements of the topology, such as for a service are monitored. At step 586, a service graph is generated and configured. At step 588, a service graph is displayed. At step 590, issues with configuration, operation and performance of a service or the topology may be identified or determined.

At step 582, a device identifies a topology for one or more services. The device may obtain, access or receive the topology 510 from storage, such as a database. The device may be configured with a topology for a service, such as by a user. The device may discover the topology or portions therefore via one more discovery protocols communicated over the network. The device may obtain or receive the topology or portions thereof from one or more other devices via the network. The device may identify the network elements making up one or more services. The device may identify functions providing the one or more services. The device may identify other devices or network elements providing the functions. The device may identify the network elements for north-west traffic. The device may identify the network elements for east-west traffic. The device may identify the microservices providing a service. In some implementations, the service graph generator establishes or generates a service graph based on the topology. The service graph may be stored to memory or storage.

At step 584, the metrics of elements of the topology, such as for a service are monitored. The device may receive metrics about the one or more network elements of the topology from other devices. The device may determine metrics from network traffic traversing the device. The device may receive metrics from network elements of the topology, such as via reports or events. The device may monitor the service to obtain or receive metrics about the service. The metrics may be stored in memory or storage, such as in association with a corresponding service graph. The device may associate one or more of the metrics with a corresponding node of a service graph. The device may associate one or more of the metrics with a corresponding arc of a service graph. The device may monitor and/or obtain and/or receive metrics on a scheduled or predetermined frequency. The device may monitor and/or obtain and/or receive metrics on a continuous basis, such as in real-time or dynamically when metrics change.

At step 586, a service graph is generated and configured. A service graph generator may generate a service graph based at least on the topology. A service graph generator may generate a service graph based at least on a service. A service graph generator may generate a service graph based on multiple services. A service graph generator may generate a service graph based at least on the microservices making up a service. A service graph generator may generate a service graph based on a data center, servers of the data center and/or services of the data center. A service graph generator may generate a service graph based at least on east-west traffic and corresponding network elements. A service graph generator may generate a service graph based at least on north-south traffic and corresponding network elements. A service graph generator may configure the service graph with parameters, configuration data or metadata about the elements represented by a node or arc of the service graph. The service graph may be generated automatically by the device. The service graph may be generated responsive to a request by a user, such as via a comment to or user interface of the device.

At step 588, a service graph is displayed. The device, such as via service graph generator, may create a service graph display 514 to be displayed or rendered via a display device, such as presented on a user interface. The service graph display may include visual indicators or graphical characteristics (e.g., size, shape or color) of the nodes and arcs of the service graph to identify status, state or condition of elements associated with or corresponding to a node or arc. The service graph display may be displayed or presented via a dashboard or other user interface in which a user may monitor the status of the service and topology. The service graph display may be updated to show changes in metrics or the status, state and/or condition of the service, the topology or any elements thereof. Via the service graph display, a user may interface or interact with the service graph to discover information, data and details about any of the network elements, such as the metrics of a microservice of a service.

At step 590, issues with configuration, operation and performance of a service or the topology may be identified or determined. The device may determine issues with the configuration, operation or performance of a service by comparing metrics of the service to thresholds. The device may determine issues with the configuration, operation or performance of a service by comparing metrics of the service to previous or historical values. The device may determine issues with the configuration, operation or performance of a service by identifying a change in a metric. The device may determine issues with the configuration, operation or performance of a service by identifying a change in a status, state or condition of a node or arc or elements represented by the node or arc. The device may change the configuration and/or parameters of the service graph. The device may change the configuration of the service. The device may change the configuration of the topology. The device may change the configuration of network elements making up the topology or the service. A user may determine issues with the configuration, operation or performance of a service by reviewing, exploring or interacting with the service graph display and any metrics. The user may change the configuration and/or parameters of the service graph. The user may change the configuration of the service. The user may change the configuration of the topology. The device may change the configuration of network elements making up the topology or the service.

F. Systems and Methods for Displaying a Service Graph in Association with a Time of a Detected Anomaly Systems and methods for displaying a service graph in association with a time of a detected anomaly are discussed herein. As described above, a service graph may be a tool by which a service including various microservices corresponding thereto may be visualized. Such a tool may be used for network traffic monitoring purposes, diagnostic purposes, troubleshooting purposes, and so forth. The service graph may depict various traffic volume, latency, error rates, and other metrics corresponding to the service. In some implementations, one or more microservices of the service may malfunction, fail, glitch, or otherwise experience a condition which is an anomaly. To correct such conditions, an administrator may identify a cause of the condition. However, identification of the cause of the condition may be difficult without understanding conditions of the microservice(s) leading up to and/or following occurrence of the anomaly.

In some implementations, a device (such as an intermediary device) may store a plurality of snapshots of a service graph of a plurality of microservices generated for each of a plurality of time increments over a time period. The snapshots may include metrics at a respective time increment from execution of each of the microservices. The device may detect an anomaly with operation of one or more of the microservices. The device may identify a set of snapshots of the service graph within a predetermined time period of a time of the anomaly. The device may display each of a sequence of the snapshots in the set corresponding to time increments within the predetermined time period of the time of the anomaly. In some implementations, the device may display a number of snapshots (or snapshots within the predetermined time period) before and/or after the time of the anomaly. In some embodiments, the number of snapshots (or predetermined time period) may change based on a scale of the anomaly. For instance, where the anomaly is a minor anomaly (e.g., a small change from historical data, as one example) the number of snapshots (or predetermined time period) may be smaller than where the anomaly is a greater anomaly (e.g., a large change from historical data).

Rather than a user (such as an administrator) manually evaluating the microservice(s) which contributed to or caused the anomaly, the implementations described herein may automatically detect the anomaly and provide a sequence of snapshots of the service graph to identify the state of the service graph that may have contributed to the anomaly. The administrator can thus quickly and efficiently determine the cause of the anomaly based on the data from or represented in the service graph. The implementations described herein may increase the efficiency of diagnostics of anomalies for microservices corresponding to a service by providing a visual aid by which an administrator can observe metrics corresponding to the microservice(s) prior to, during, and/or after the anomaly. The implementations described herein may decrease downtime as a result of such anomalies by providing a faster mechanism by which an administrator can remediate the cause of the anomaly. Various other benefits and advantages of the embodiments described herein are further detailed below.

Figure 6A:
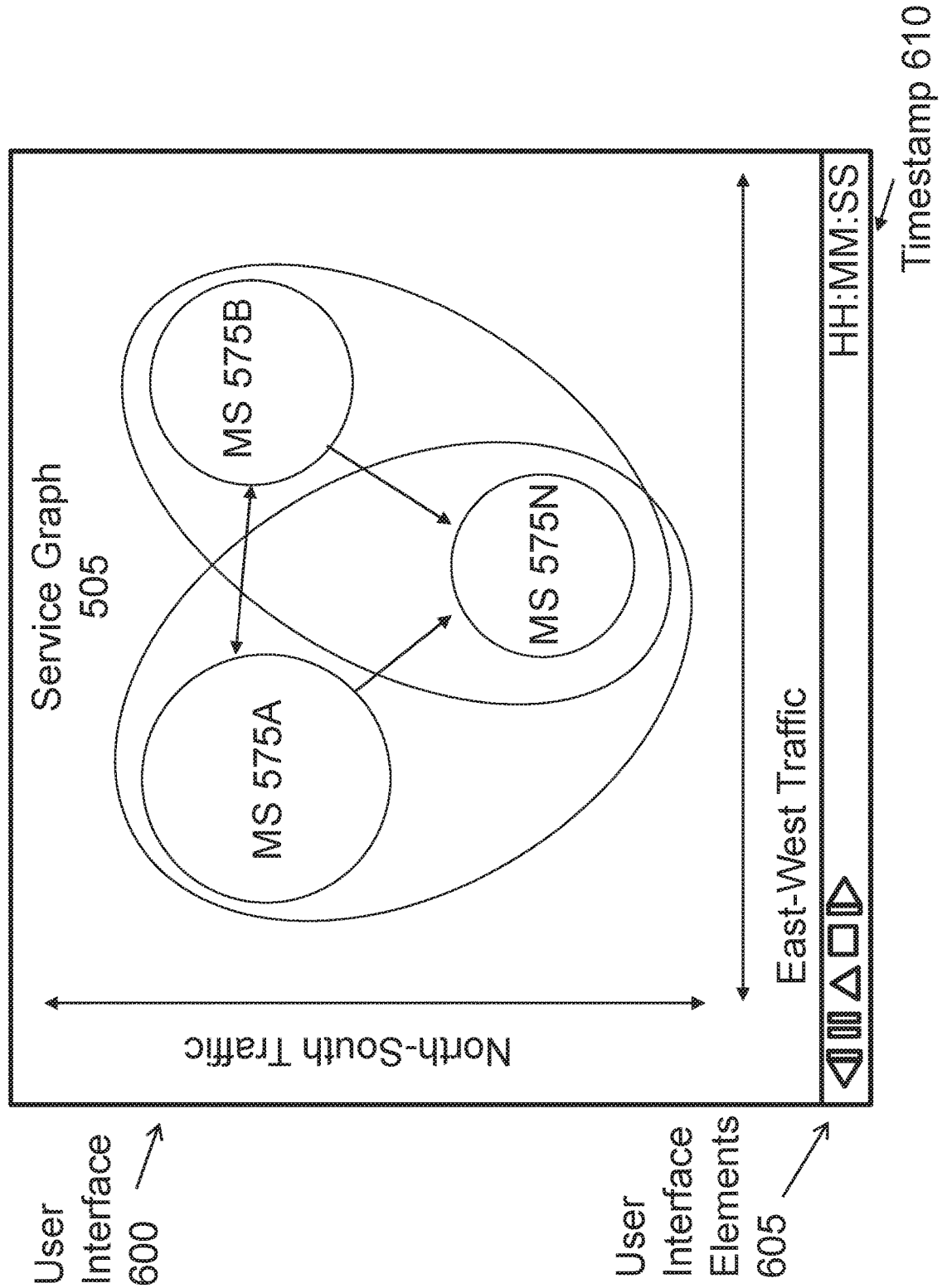
FIG. 6A is an example user interface including a service graph, in accordance with an illustrative embodiment.

Referring now to FIG. 6A, depicted is an example user interface 600 including a service graph 505. The service graph 505 may be similar to the service graph 505 shown in FIG. 5B and described above. The user interface 600 may be configured to display a sequence, order, or series of service graphs 505 over a period of time. The service graphs 505 may depict various metrics. For instance, each service graph 505 in the series of service graphs 505 may include metrics corresponding to the particular time at which the service graph 505 was generated, produced, configured, displayed, etc. (e.g., by the service graph generator and configurator 512 as described above). The user interface 600 may include a timestamp 605 corresponding to the time at which the service graph 505 was generated, produced, configured, displayed, etc. The user interface 600 may include a plurality of user interface elements 610 to control the displaying or viewing of (e.g., to play, pause, stop, fast forward, rewind, etc.) the series of service graphs 505 within the user interface 600. A user, such as an administrator, may provide inputs to the user interface 600 (e.g., to the user interface elements 610 of the user interface 600) to determine a cause of an anomaly corresponding to the microservice(s) as described in greater detail below.

Referring now to FIG. 5A and FIG. 6A, as described in greater detail above in Section E, the service graph 505 includes any combination of nodes 570A-N and arcs 572A-N that represent a service, topology, or portions thereof. Nodes 570A-N and arcs 572A-N may be arranged to identify or describe the physical and/or logical deployment of the service (e.g., including microservices corresponding to the service), identify or describe the flow of network traffic during access or use of the service, and/or any elements used to access the service. The service graph generator 512 may read and/or write data representing the service graph 505 to a database 520 for subsequent use or display, as described in greater detail below. The service graph monitor 518 may be configured to receive, identify, process metrics 518 of the topology 510 corresponding to the service graph 505. The service graph monitor 518 monitors via metrics 518 the configuration, performance and operation of elements of a service graph. The service graph monitor 518 may obtain metrics from one or more devices on the network. The service graph monitor may identify or generate metrics, such as network traffic rate or flow, latency, error rate, etc. from network traffic traversing the device(s) of the service graph monitor.

The service graph generator 512 may generate service graphs 505 at various time increments. For instance, the service graph generator 512 may generate a service graph 505 for a service at a time interval of once every 10 seconds, 20 seconds, 30 seconds, minute, 5 minutes, and so forth. Each service graph 505 may include metrics corresponding to the traffic at the time of generation by the service graph generator 512, which may be displayed in a window within the user interface 600 including the service graph 505, reflected in characteristics of the service graph 505 itself, and so forth.

The service graph generator 512 may generate store snapshots of each of the service graphs 505, such as at time increments while monitoring the topology corresponding to the service graph. In some embodiments, a snapshot may comprise data to represent, an image of the service graphs 505 at a particular time, such as data for generating, constructing, building, assembling, or otherwise forming the service graphs 505 at a particular time. In some cases, the data may include computer-readable instructions for generating, constructing, building, assembling, or otherwise forming the service graphs. A snapshot may comprise data for forming the service graphs as well as metrics for including in or displaying as part of or with the service graph. In some implementations, the service graph generator 512 may store snapshots of the service graphs 505 in the database 520 in association with the timestamp corresponding to the time at which the respective service graph 505 was generated, displayed, stored, etc. The service graph generator 512 may store the metrics for each service graph 505 the database 520 in association with the service graph 505. The metrics and/or service graphs 505 may be stored in the database 520 and may be indexed by the timestamp such that, at any given time, the service graph generator 512 can identify a service graph and corresponding metrics for re-generating, re-constructing, re-building, re-assembling, or otherwise re-forming the service graphs 505 based on the data from the database 520.

The service graph generator 512 may be configured to generate and store snapshots of the service graphs 505 and corresponding information (collectively referred to as service graphs 505) for a predetermined amount of time in the database 520. For instance, the service graph generator 512 may store the service graphs 505 in the database 520 for a number of days, weeks, months, etc. The service graph generator 512 and/or a service, program, etc. may be executing on the server hosting the database 520 and may monitor a difference between the timestamp corresponding to when the service graph 505 is stored or otherwise saved to the database 520 and a current date and/or time. The service graph generator 512 and/or service or program may automatically purge the data corresponding to the service graphs 505 from the database 520. In some implementations, the service graph generator 512 may maintain a predetermined number of entries in the database 520 which are sequentially written and re-written. As such, the service graph generator 512 may overwrite an entry in the database 520 with a new entry corresponding to a service graph 505. In some implementations, the service graph generator 512 may store the service graphs 505 for a user configured period of time.

The service graph monitor 516 may be configured to detect issues with configuration, operation, status, and/or performance (collectively referred to herein as anomalies) of execution, implementation, or otherwise operation of a service or microservice within a service or any components of the topology supporting the services and microservices. The service graph monitor 516 may identify anomalies for service or microservice by comparing metrics of the service or microservice to thresholds, or previous, historical or benchmark values for such metrics. The service graph monitor 516 may monitor metrics (e.g., network traffic rates, error rates, latency, etc.) of the service or microservice continuously, near-continuously, at the time at which the service graph 505 is generated, etc. The service graph monitor 516 may include, maintain, retrieve, or otherwise access metric thresholds corresponding the metrics for the service. The metric thresholds may be static, dynamic, adaptive, manually or automatically updated, etc. The service graph monitor 516 may compare the metrics for the service graph 505 to the corresponding metric thresholds. The service graph monitor 516 may identify anomalies based on the comparison (e.g., an anomaly with network traffic rate where traffic rate is below a corresponding metric threshold, an anomaly with error rates where the error rate exceeds a corresponding metric threshold, an anomaly in latency where latency exceeds a corresponding metric threshold, and so forth).

The service graph monitor 516 may determine issues with the configuration, operation or performance of a service or microservice by comparing metrics of the service to previous or historical values which may be included, retrieved, or otherwise accessed by the service graph monitor 516, such as by comparing snapshots of a service graph at different points in time. The service graph monitor 516 may determine whether current metrics are within, for instance, a standard deviation of the previous or historical values, a historical average or mean, etc. The service graph monitor 516 may determine issues with the configuration, operation or performance of a service or microservice by identifying a change or delta in a metric (e.g., a spike in error rates, an increase in latency, a decrease in network traffic including but not limited to decreases of network traffic to zero network traffic). The service graph monitor 516 may determine issues with the configuration, operation or performance of a service or microservice by determining a change in status of the service or microservice (e.g., a change from active to inactive, a change from active to partially active, etc.). The service graph monitor 516 may monitor the status of each of the service(s) or microservice(s) which make up the service. The services and/or microservices may automatically change their status upon occurrence of an anomaly (e.g., when network traffic falls below a threshold, when error rates exceed a threshold, latency exceeds a threshold, etc.). The service graph monitor 516 may identify the anomaly upon detection of a status change of the service and/or microservice.

The service graph display 514 may be configured to locate, look-up, or, retrieve, or otherwise identify a set of snapshots of service graphs 505. The service graph display 514 may identify the set of snapshots of the service graphs 505 based on the time at which the service graph monitor 516 identifies the anomaly. The service graph monitor 516 may record or otherwise store the time at which the service graph monitor 516 identifies the anomaly. The service graph display 514 may cross-reference the time at which the anomaly is detected by the service graph monitor 516 with timestamps associated with service graphs 505 in the database 52. As stated above, the database may be indexed by timestamp. The service graph display 514 may identify the timestamp corresponding to a service graph 505 closest to the time at which the anomaly is detected by the service graph monitor 516. The service graph display 514 may identify the snapshot of the service graph 505 which corresponds to the identified timestamp in the database 520.

The service graph display 514 may be designed or implemented to identify a set of snapshots of the service graph 505 within a predetermined time period from the time of the anomaly. In some embodiments, the service graph display 514 may select the predetermined time frame based on the anomaly. For instance, the service graph display 514 may identify a scale of the anomaly based on the comparison of the anomaly to a threshold, based on the comparison of the anomaly to historical metrics, and so forth. The service graph display 514 may select the predetermined time period in accordance with the scale of the anomaly. For instance, as the anomaly increases in scale (e.g., a larger difference from historical metrics, for example) the predetermined time period may correspondingly increase. Hence, the predetermined time period may change in proportion to the scale of the anomaly.

The predetermined time period may be configurable by a user. The predetermined time period may be a predetermined time before the anomaly. The predetermined time period may be a predetermined time after the anomaly. The predetermined time period may be a predetermined time before and/after the anomaly, such as a time window in which the anomaly is detected. The predetermined time period may be a predetermined number of instances of snapshots before the anomaly. The predetermined time period may be a predetermined number of instances of snapshots after the anomaly. The predetermined time period may be a predetermined number of instances of snapshots before and/after the anomaly. The predetermined time period may be a rolling window of time or instances of service graphs in which the anomaly is detected.

After the service graph display 514 identifies the service graph 505 having an associated timestamp corresponding to the time at which the service graph monitor 516 identifies the anomaly, the service graph display 514 may identify one or more additional service graphs 505 having timestamps that lead up to and/or follow the time of the anomaly. The corresponding time may be the time closest to the time of the anomaly, either before or after the anomaly or at the time of the anomaly. The corresponding time may be the time at which a snapshot did not have an anomaly before the time a snapshot has the anomaly. The predetermined timeframe may thus include a time prior to the anomaly (e.g., leading up to the anomaly), a time of the anomaly (e.g., closest to the time of the anomaly), and/or a time following the anomaly (e.g., immediately after the anomaly). The service graph display 514 may select, from the database 520, the set of snapshots of the service graph 505 within the predetermined timeframe of the time of the anomaly. In some implementations, the service graph display 514 may identify timestamps having time which falls within the predetermined timeframe of the time of the anomaly. In some implementations (such as where the database 520 is arranged, sorted, or otherwise indexed by timestamp), the service graph display 514 may select a number of entries of the database 520 which precede or follow the entry corresponding to the snapshot of the service graph 505 having a timestamp closest to the time of the anomaly.

In some implementations, the service graph display 514 may be configured to callout, alert, or otherwise highlight the anomaly within the service graph 505 within the set of service graphs 505. The service graph display 514 may be configured to highlight the anomaly by highlighting the metrics which were used by the service graph monitor 516 for identifying the anomaly. For instance, where the service graph monitor 516 identifies the anomaly due to a decrease in network traffic, the service graph display 514 may highlight the metric corresponding to the network traffic represented on the service graph 505. As another example, where the service graph monitor 516 identifies the anomaly due to an increase in latency, the service graph display 514 may highlight the metric corresponding to the latency represented on the service graph 505. As yet another example, where the service graph monitor 516 identifies the anomaly due to an increase in error rate, the service graph display 514 may highlight the metric corresponding to the error rate represented on the service graph 505.

The service graph display 514 may highlight the metric used for identifying the anomaly by changing a color of the text in the window within the user interface 600, by increasing the size or prominence of the metric within the service graph 505, increasing the size of a corresponding node 575 of the service graph 505, modifying the arc extending between nodes 575, and so forth. In each of these embodiments, the service graph display 514 may be configured to modify the service graph(s) 505 within the set to highlight at least a portion or an aspect of the service graphs 505 corresponding to the anomaly.

The service graph display 514 may be designed or implemented to display each of the selected snapshots of the service graph 505 in the set in sequence of the timestamp. The service graph display 514 may display the set of snapshots by generating a signal which is communicated to a client device associated with an administrator. The signal may include the set of snapshots, the sequence, the user interface, etc. (or instructions for generating the set of snapshots, the user interface, and so forth). The signal may cause the client device to automatically display each of the snapshots in the set in temporal sequence corresponding to the service. In some implementations, the signal may cause a notification of the anomaly to display on the client device. The notification may prompt a user, such as the administrator, to launch the user interface 600 to display the sequence of selected snapshots in the set. In some implementations, the service graph display 514 may display each of the selected snapshots of the service graph 505 responsive to a request. The user may generate a request by selecting the user interface element 605 corresponding to playing the sequence of service graphs 505 within the set, for instance. The service graph display 514 may receive the request and display each of the selected snapshots of the service graphs 505 responsive to receiving the request. By displaying each of the snapshots in order forms a sequence of service graphs similar to or equivalent to a video of service graphs.

Responsive to displaying the sequence of the service graphs 505, a user can diagnose the cause of the anomaly for modifying the service and/or microservices. User can view portions of the sequence of the service graph to view a change in any components of the service graph before, at or after the anomaly. The user can select the user interface elements 605 to rewind, pause, fast forward, etc. the sequence of service graphs 505 within the set to identify the changes in the network traffic which caused the anomaly, much as a user would with a video. The service graphs 505 may highlight the network conditions which triggered the service graph monitor 516 to identify the anomaly. The user can view the sequence of service graphs 505 to determine what caused the anomaly based on the network traffic over time. The user can correct the service and/or microservices (e.g., by replacing the service and/or microservice with a previous version, by updating the service and/or microservice with a new version, and so forth).

Figure 6B:
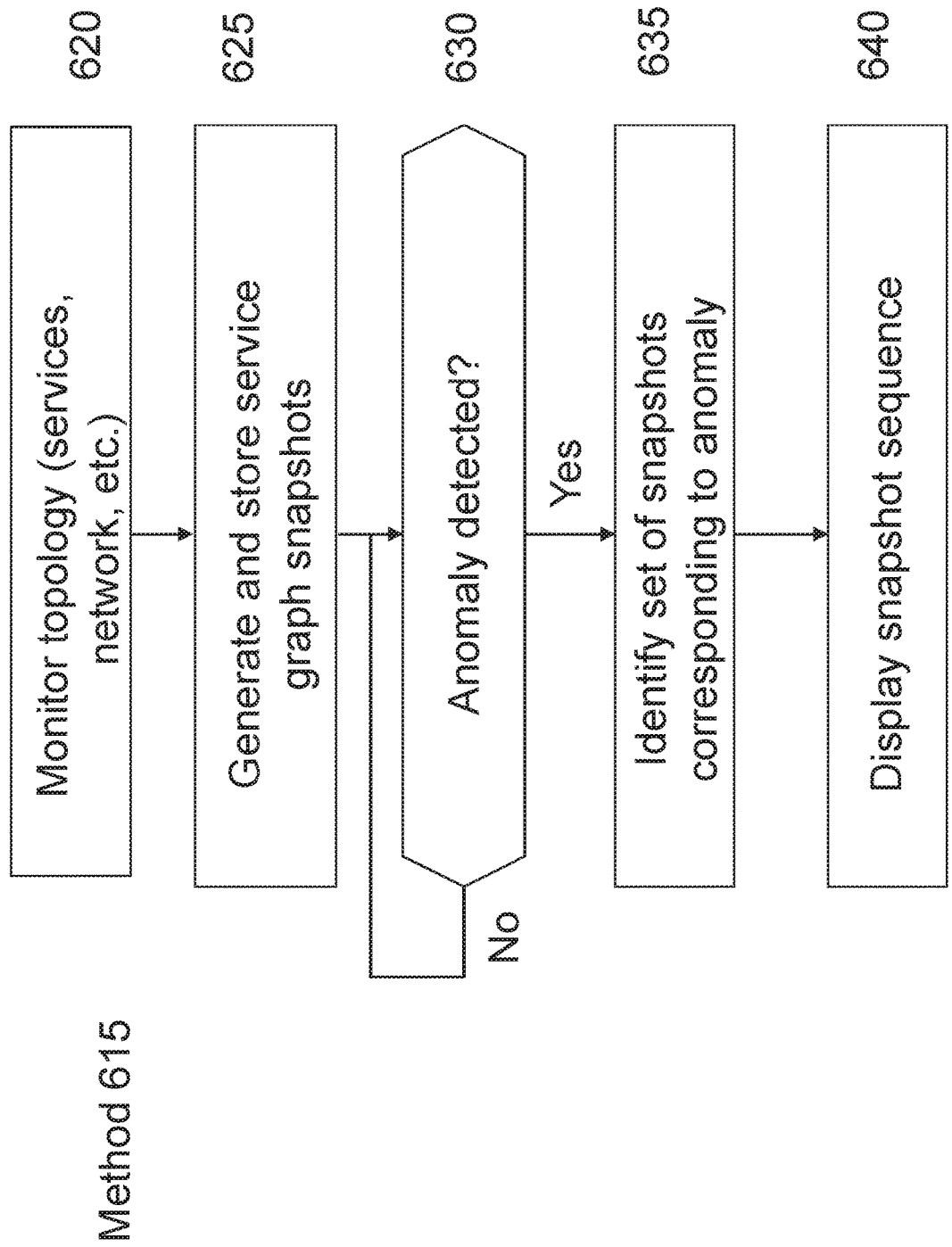
FIG. 6B is a flow diagram of a method for displaying a service graph in association with a time of a detected anomaly, in accordance with an illustrative embodiment.

Referring now to FIG. 6B, an implementation of a method for displaying a service graph in association with a time of a detected anomaly will be described. In brief overview of method 615, at step 620, network traffic, such as network traffic rate, latency, error rates, etc. are monitored. At step 625, snapshots are stored. At step 630, anomalies may or may not be detected. At step 635, a set of snapshots are identified. At step 640, the snapshots from the set are displayed.

At step 620, operation, performance and network traffic of the topology supporting the microservices and microservices, such as network traffic rate, latency, error rates, etc. (e.g., network conditions) are monitored. In some implementations, a device, such as a network or intermediary device, a server, etc., may determine, identify, monitor, or otherwise establish metrics for the microservices at time increments, such as time increments corresponding to the predetermined time period. The device may monitor metrics about the one or more network elements of the topology from other devices. The device may determine metrics from network traffic traversing the device. The device may monitor performance and/or status of network traffic between microservices. The device may determine metrics from network traffic traversing the device. The device may receive metrics from network elements of the topology, such as via reports or events. The device may monitor the service to obtain or receive metrics about the service. The device may monitor performance continuously or at various time increments or intervals. In some implementations, step 602 may be similar in some aspects to step 582 of FIG. 5C.

In some implementations, the device ma generate and store the established metrics at each of the time increments. The device may store the established metrics in a database. The device may store the established metrics at each time increment in association with a timestamp corresponding to a current time. The database may store the metrics, the timestamp, and data corresponding to a service graph, as described in greater detail below. The data and metrics may identify the operation, performance and status of the microservices including any network links between them.

The device may generate a service graph. The device may generate a service graph with the metrics. The device may generate a service graph and associate the metrics with the elements of the service graph. In some implementations, a service graph generator of the device may generate a service graph. The service graph may model, map, or otherwise represent a service including the microservices corresponding thereto. Each service may include a plurality of microservices which perform various functions which collectively provide the service. The service graph may represent a topology of the service or services. A service graph generator may generate a service graph based on a data center, servers of the data center and/or services of the data center. The service graph may be generated automatically by the device. The service graph may be generated responsive to a request by a user, such as via a comment to a user interface of the device. In some implementations, the device may generate a service graph similar to the generation of the service graph at step 586 of FIG. 5C.

At step 625, snapshots (e.g., of service graphs at various time increments) are generated and stored. The device may store a plurality of snapshots of a service graph including a plurality of microservices for various time increments over a time period. Each of the snapshots of the service graphs may include metrics at the respective time increments from execution of the microservice(s) of the service. The device may generate and store the snapshots at each time increment (such as every 10 seconds, 20 seconds, 30 seconds, minute, 5 minutes, and so forth). The device may store the service graphs generated as described above at each of the time increments. The device may store the service graphs responsive to occurrence of each of the time increments. The device may store the service graphs in the database in which the metrics are stored. The device may store the service graphs in association with respective metrics corresponding thereto. Each entry of the database may include the snapshot corresponding to the service graph, the associated metrics, and a timestamp.

At step 630, the device may monitor the topology, microservices or elements of the service graph for any anomalies. Anomalies may or may not be detected. The device may detect an anomaly with operation of one or more microservices of the plurality of services. The device may detect an anomaly with operation of elements of the topology. In some implementations, a service graph monitor may detect an anomaly based on the metrics monitored at step 620. The service graph monitor may detect the anomaly responsive to changes in metrics of the service and/or microservices. The service graph monitor may detect the anomaly based on differences between monitored metrics and stored thresholds. The service graph monitor may detect the anomaly based on differences between the monitored metrics and previous or historical metrics (e.g., outside of a threshold, outside of a standard deviation within the previous or historical metrics, from an average or mean of the previous or historical metrics, and so forth).

In some embodiments, the device may identify one or more changes to one of a status, state or condition of the one or more microservices within the predetermined time period of the time of the anomaly. The microservice(s) may automatically trigger a change in status, state or condition (e.g., from enabled to disabled, active to inactive, etc.) responsive to the anomaly. The device may monitor the status, state or condition of each of the microservices. The device may automatically identify change(s) to the status, state or condition of the microservices upon occurrence of the same.

Where the device does not detect any anomalies, the method 615 may proceed back to step 625. As such, the device may monitor performance, operation of microservices and network traffic to and via the same until the device detects an anomaly. Where the device detects an anomaly, the method 615 may proceed to step 635. In some implementations, the device may continuously monitor for anomalies, such as for any subsequent or additional anomalies or to provide for status or state of the topology, network elements and microservices of the service graph following the anomaly.

At step 635, where anomalies are detected, a set of snapshots are identified, such as to form a sequence of snapshots. The device may identify a set of snapshots from the plurality of snapshots of the service graph within a predetermined time period of a time of (e.g., before and/or after) the anomaly. The device may identify a time at which the anomaly is detected (e.g., at step 630). The database including the snapshots and metrics may be indexed by the timestamps. The device may identify a set of snapshots from the database by cross-referencing the time at with the anomaly is detected with the timestamps of the databases. The device may identify a first snapshot based on which snapshot has a timestamp closest to the time at which the anomaly is detected. The device may identify a plurality of other snapshots for including in the set of snapshots. The device may identify the other snapshots based on the timestamps within an amount of time before the anomaly and/or after the time of the anomaly. In some implementations, the device may identify a number of snapshots before and/or after the time of the anomaly. In some implementations, the device may identify each snapshot within a predetermined time period before and/or after the occurrence of the anomaly. In some embodiments, the number of snapshots (or predetermined time period) may change based on a scale of the anomaly. For instance, where the anomaly is a minor anomaly (e.g., a small change from historical data, as one example) the number of snapshots (or predetermined time period) may be smaller than where the anomaly is a greater anomaly (e.g., a large change from historical data). The device may identify the other snapshots to include in the set based on the timestamps which follow or proceed the timestamp of the first snapshot.

In some implementations, the device may determine one or more highlights of the service associated with the detected anomaly. The device may determine one or more highlights to highlight the metrics which were used to determine, identify, or otherwise detect the anomaly. The device may determine the highlight(s) responsive to detecting the anomaly. The device may determine the highlight(s) responsive to identifying the set of snapshots. The device may determine the highlight(s) responsive to identifying the first snapshot. The device may determine the highlight(s) based on which of the metrics were used by the service graph monitor to detect the anomaly (e.g., at step 630). The device may determine the highlight(s) by modifying a color of portions of the service graph, increase the size of nodes of the service graph, modify the arc extending between nodes, highlight text within a window displaying metrics, and so forth.

At step 640, the snapshots from the set are displayed. The device may display each of the snapshots in the set of snapshots in sequence corresponding to time increments within the predetermined time period of the time of the anomaly. The device may display the snapshots with the highlights in the service graph(s). The device may display changes in the service graph(s) over time, such as differences in network traffic, differences in status of microservices, and so forth, which may be reflected in the service graphs. The device may display the snapshots responsive to receiving a request by the administrator. The device may display the snapshots responsive to detecting the anomaly. The device may display the snapshots responsive to identifying the set of snapshots. The device may display the snapshots by transmitting a signal to a client device corresponding to a user (such as an administrator). The signal may automatically trigger generation of a user interface for displaying the snapshots. The signal may be a notification. As such, the device may provide a notification of the anomaly to the client device. The notification may automatically display on the client device. The notification may include buttons for launching a user interface including the set of snapshots which are displayed in sequence. Upon selection of the button by a user on the client device, the device may trigger automatically displaying the set of snapshots. In some implementations, the device may receive a request for displaying the set of snapshots. The device may receive the request responsive to the user identifying an incident or anomaly. The device may automatically display the set of snapshots responsive to receiving the request (e.g., from the client device upon which the user initiated the request). The device may automatically display the set of snapshots (or transmit a notification for displaying the set of snapshots) at various intervals, such as once an hour, once a day, once a week, and so forth. The user may play the snapshots in sequence, rewind or fast forward the snapshots, pause the snapshots and so forth using corresponding buttons on the user interface. The user may monitor network conditions of the network elements, services, and/or microservices leading up to, during, and following the anomaly by controlling the user interface to display the snapshots. The user may diagnose and resolve issues with the services/microservices based on the monitored network conditions as reflected in the snapshots.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method for displaying a service graph in association with a time of a detected anomaly, the method comprising:
    (a) storing, by a device, a plurality of snapshots of a service graph of a plurality of microservices generated for each of a plurality time increments over a time period, each of the plurality of snapshots of the service graphs comprising metrics at a respective time increment from execution of each of the plurality of microservices;
    (b) detecting, by the device, an anomaly with operation of one or more microservices of the plurality of services;
    (c) identifying, by the device, a set of snapshots from the plurality of snapshots of the service graph within a predetermined time period of a time of the anomaly; and
    (d) displaying, by the device, each of the snapshots in the set of snapshots in sequence corresponding to time increments within the predetermined time period of the time of the anomaly.

2. The method of claim 1, wherein the predetermined time period comprises at least one of an amount of time before the time of the anomaly or an amount of time after the time of the anomaly.

3. The method of claim 1, further comprising determining, by the device, one or more highlights of the service associated with the detected anomaly.

4. The method of claim 3, wherein (d) further comprises displaying, by the device, the one or more highlights in the service graph displayed via the set of snapshots.

5. The method of claim 1, further comprising identifying, by the device, one or more changes to one of a status or metric of the one or more microservices within the predetermined time period of the time of the anomaly.

6. The method of claim 5, wherein (d) further comprises displaying, by the device, the one or more changes in the service graph displayed via the set of snapshots.

7. The method of claim 1, wherein (a) further comprises establishing, by the device at each of the time increments, metrics for the plurality of microservices.

8. The method of claim 7, further comprising storing, by the device, metrics at each of the time increments with each snapshot of the plurality of snapshots.

9. The method of claim 1, wherein (b) further comprises providing, by the device responsive to the detection, a notification of the anomaly.

10. The method of claim 1, further comprising receiving, by the device, a request for the service graph at the time of the incident and responsive to the request, displaying one or more of the set of snapshots.

11. A system for displaying a service graph in association with a time of a detected anomaly, the system comprising:
    a device comprising a plurality of processors coupled to memory and configured to:
        store a plurality of snapshots of a service graph of a plurality of microservices generated for each of a plurality time increments over a time period, each of the plurality of snapshots of the service graphs comprising metrics at a respective time increment from execution of each of the plurality of microservices;
        detect an anomaly with operation of one or more microservices of the plurality of services;
        identify a set of snapshots from the plurality of snapshots of the service graph within a predetermined time period of a time of the anomaly; and
        display each of the snapshots in the set of snapshots in sequence corresponding to time increments within the predetermined time period of the time of the anomaly.

12. The system of claim 11, wherein the predetermined time period comprises at least one of an amount of time before the time of the anomaly or an amount of time after the time of the anomaly.

13. The system of claim 11, wherein the device is further configured to determine one or more highlights of the service associated with the detected anomaly.

14. The system of claim 13, wherein displaying each of the snapshots further comprises displaying the one or more highlights in the service graph displayed via the set of snapshots.

15. The system of claim 11, wherein the device is further configured to identify one or more changes to one of a status or metric of the one or more microservices within the predetermined time period of the time of the anomaly.

16. The system of claim 15, wherein displaying each of the snapshots further comprises displaying the one or more changes in the service graph displayed via the set of snapshots.

17. The system of claim 11, wherein storing the plurality of snapshots further comprises establishing, at each of the time increments, metrics for the plurality of microservices.

18. The system of claim 17, wherein the device is further configured to store metrics at each of the time increments with each snapshot of the plurality of snapshots.

19. The system of claim 11, wherein detecting the anomaly further comprises providing, responsive to the detection, a notification of the anomaly.

20. The system of claim 11, wherein the device is further configured to receive a request for the service graph at the time of the incident and responsive to the request, displaying one or more of the set of snapshots.

* * * * *